US006915245B1

(12) United States Patent
Hinton et al.

(10) Patent No.: US 6,915,245 B1
(45) Date of Patent: Jul. 5, 2005

(54) METHOD OF SIMULATING A FLUID BY ADVECTION OF A TIME-WEIGHTED EQUILIBRIUM DISTRIBUTION FUNCTION

(75) Inventors: Frederick L. Hinton, Escondido, CA (US); Marshall N. Rosenbluth, La Jolla, CA (US)

(73) Assignee: General Atomics, San Diego, CA (US)

( * ) Notice: Subject to any disclaimer, the term of this patent is extended or adjusted under 35 U.S.C. 154(b) by 609 days.

(21) Appl. No.: 09/953,573

(22) Filed: Sep. 14, 2001

Related U.S. Application Data (60) Provisional application No. 60/233,758, filed on Sep. 14, 2000.

(51) Int. Cl.[7] .............................................. G06F 19/20
(52) U.S. Cl. ...................... 703/2; 703/6; 703/9; 702/50
(58) Field of Search ........................ 703/2, 6, 9; 702/50

(56) References Cited

U.S. PATENT DOCUMENTS

| | | | | |
|---|---|---|---|---|
| 5,377,129 A | * | 12/1994 | Molvig et al. ................. | 703/9 |
| 5,432,718 A | * | 7/1995 | Molvig et al. ................. | 703/9 |
| 5,606,517 A | * | 2/1997 | Traub et al. ................... | 703/9 |
| 5,801,969 A | * | 9/1998 | Nagahama ..................... | 703/9 |
| 5,910,902 A | * | 6/1999 | Molvig et al. ................. | 703/6 |
| 5,953,239 A | * | 9/1999 | Teixeira et al. ................ | 703/6 |
| 6,266,071 B1 | * | 7/2001 | Stam et al. .................. | 345/473 |

OTHER PUBLICATIONS

Qian et al., Recent Advances in Lattice Boltzmann Computing, Ann. Rev. Comp. Phys. , 1995, 195–242, vol. 3.
McNamara et al., Stabilization of Thermal Lattice Boltzmann Models, J. Stat. Phys., 1995, 395–408, vol. 81 Nos. 1/2, Plenum Publishing Corporation.
Sterling et al., Stability Analysis of Lattice Boltzmann Methods, J. Comp. Phys., 1996, 196–206, vol. 123, Academic Press, Inc.
Pavlo et al., Linear Stability Analysis of Thermo–Lattice Boltzmann Models, J. Comp. Phys. 1998, 79–91, vol. 139, Academic Press.
Vahala et al., Thermal lattice Boltzmann simulation for multispecies fluid equilbration, Phys. Rev. E., 2000, 507–516, vol. 62 No. 1, The American Physical Society.
Chen et al., H–theorem and origins of instability in thermal lattice Boltzmann models, Comput. Phys. Commun., 2000, 21–31, vol. 129., Elsevier Science B. V.
Chen et al., Digital Physics Approach to Computational Fluid Dynamics: Some Basic Theoretical Features, Int. J. Mod. Phys. C, 1997, 675–684, vol. 8 No. 4, World Scientific Publishing Company.
S. Wolfram, Cellular Automaton Fluids 1: BasicTheory, J. Stat. Phys. 1986, 471–526, vol. 45 Nos. 3/4.
Karlin et al., Equilibria for discrete kinetic equations, Phys. Rev. E, 1998, R4053–R4056, Third Series vol. 58 No. 4, The American Physical Society.
C. Teixeira, Abstract of Continuum Limit of Lattice Gas Fluid Dynamics, 1992, PhD Thesis, Massachusetts Institute of Technology.

* cited by examiner

*Primary Examiner*—Thai Phan
(74) *Attorney, Agent, or Firm*—Thomas F. Lehens; Fitch, Even, Tabin & Flannery (57) ABSTRACT

A method for simulating a compressible fluid includes selecting an equilibrium distribution function for simulating a fluid; receiving as input an initial value of at least one variable of a distribution function having for at least two time steps; setting the distribution function equal to the equilibrium distribution function; deriving an advected distribution function from the distribution function evaluated at the at least two time steps; calculating a current value of the at least one variable from the advected distribution function; and generating as output the current value of the at least one variable. The simulation of a fluid in accordance with the present invention has inherent positive hyperviscosity and hyperdiffusivity for very small values of viscosity and thermal diffusivity, and short wavelength modes are shown to be stable for temperatures above a lower limit. Finite amplitude sound waves are shown to steepen as expected from gas dynamic theory.

26 Claims, 4 Drawing Sheets

METHOD OF SIMULATING A FLUID BY ADVECTION OF A TIME-WEIGHTED EQUILIBRIUM DISTRIBUTION FUNCTION

CROSS-REFERENCE TO RELATED APPLICATIONS

This application claims priority under 35 USC § 119(e) to U.S. Provisional Patent Application Ser. No. 60/233,758 of Hinton et al., for MODIFIED LATTICE BOLTZMANN FLUID SIMULATION METHOD, filed Sep. 14, 2000, incorporated herein by reference.

FIELD OF THE INVENTION

The present invention relates generally to computer simulations of a compressible fluid. More specifically, but without limitation thereto, the present invention relates to a method for simulating a compressible fluid by advection of an equilibrium distribution function.

SUMMARY OF THE INVENTION

In one aspect of the present invention, a method includes selecting an equilibrium distribution function for simulating a fluid; receiving as input an initial value of at least one variable of a distribution function having at least two time steps; setting the distribution function equal to the equilibrium distribution function; deriving an advected distribution function from the distribution function evaluated at the at least two time steps; calculating a current value of the at least one variable from the advected distribution function; and generating as output the current value of the at least one variable.

In another aspect of the present invention, a computer program product includes a medium for embodying a computer program for input to a computer; and a computer program embodied in the medium for causing the computer to perform the following functions: selecting an equilibrium distribution function for simulating a fluid; receiving as input an initial value of at least one variable of a distribution function having for at least two time steps; setting the distribution function equal to the equilibrium distribution function; deriving an advected distribution function from the distribution function evaluated at the at least two time steps; calculating a current value of the at least one variable from the advected distribution function; and generating as output the current value of the at least one variable.

The simulation of a compressible fluid in accordance with the present invention has inherent positive hyperviscosity and hyperdiffusivity for very small values of viscosity and thermal diffusivity, and short wavelength modes are shown to be stable for temperatures above a lower limit. Finite amplitude sound waves in a fluid are shown to steepen as expected from gas dynamic theory.

BRIEF DESCRIPTION OF THE DRAWINGS

The present invention is illustrated by way of example and not limitation in the accompanying figures, in which like references indicate similar elements, and in which.

Appendix I is a list of publications incorporated herein by reference.

Appendix II is a listing of a computer program according to an embodiment of the present invention.

Elements in the figures are illustrated for simplicity and clarity and have not necessarily been drawn to scale. For example, the dimensions of some of the elements in the figures may be exaggerated relative to other elements to help to improve understanding of embodiments of the present invention.

DESCRIPTION OF THE ILLUSTRATED EMBODIMENTS

A fluid is a medium which can take on any shape and conforms itself to boundaries placed within and around it. Familiar examples are air and water. Gases such as air consist of molecules which travel in approximately straight paths between collisions with other molecules, with the duration of a collision being much shorter than the duration of the straight path motion. Lattice Boltzmann methods for simulating fluids use a simplified molecular model in which a particle can have one of only a few possible velocities and can only move between regularly spaced points in space. In these methods, particle motion in the fluid is modeled by an "advection" step, followed by "equilibration" in which the distribution of velocities is changed in a way meant to mimic the effect of collisions in a real gas.

In previous versions of the lattice Boltzmann method, the advection step used only information from one previous time in the history of the particle motion. In contrast to previous methods, an embodiment of the present invention weights information from at least two previous times using a relative weighting parameter alpha. The benefits of using this two-time advection method were not obvious until the inventors discovered that two-time advection solved the problem of numerical instability inherent in previous lattice Boltzmann methods, especially under conditions of low viscosity. Viscosity is a measure of the frictional force between layers of the fluid. The frictional force between layers is very small in real fluids under some interesting conditions.

Also, in previous versions of the lattice Boltzmann method, the equilibration step combines an assumed equilibrium distribution function with the advected distribution function using a parameter omega that is related to the effective collision frequency. In embodiments of the present invention, the use of this parameter is optional, and the equilibration step may simply set the velocity distribution function equal to the equilibrium distribution function.

Also in contrast to previous methods is the equilibrium distribution function of the present invention, in which more moment constraints are used to determine equilibrium. In addition to the constraints that the density, flow velocity, and energy density moments must be the same as those obtained from the advected distribution function, the equilibrium distribution function of the present invention requires that the momentum flux and energy flux are related to the other moments in a way which is consistent with the ideal fluid (Euler) equations. The additional constraints ensure that the ideal fluid equations are recovered exactly in the limit of zero time step, eliminating certain types of calculation errors that can obscure the results.

As used herein, a mode is defined as a perturbation in density, temperature, or flow velocity having a shape that is constant in the time dimension; however, the mode can move through space by being carried, i.e., convected, by the fluid. A wave is a specific type of mode which propagates through the fluid, in addition to being convected by the fluid.

The term "advection" as used herein means the transfer of information between points of a spatial grid by moving particles of a fluid before they collide with other particles. The information transferred includes, for example, particle density, momentum density, and energy density.

The term "overrelaxation" as used herein has two different contexts: (1) Advection with overrelaxation refers to the use of the weighting parameter alpha in the multiple-time advection method of the present invention. (2) Collisional overrelaxation refers to the use of the frequency parameter omega in the equilibration step.

In one aspect of the present invention, a method for simulating a compressible fluid includes receiving as input an initial value of at least one variable of a distribution function having at least two time steps; setting the distribution function equal to the equilibrium distribution function; deriving an advected distribution function from the distribution function evaluated at the at least two time steps; calculating a current value of the at least one variable from the advected distribution function; and generating as output the current value of the at least one variable.

The simulation of a compressible fluid in accordance with the present invention has inherent positive hyperviscosity and hyperdiffusivity for very small values of viscosity and thermal diffusivity, and short wavelength modes are shown to be stable for temperatures above a lower limit.

A compressible fluid may be simulated by an algorithm using the lattice Boltzmann method, which is described in References (1) and (2). The lattice Boltzmann method has the potential for providing fast algorithms for fluid simulations, but it tends to be numerically unstable when temperature variations are allowed. Also, the lattice Boltzmann method performs collisional overrelaxation, but not advection with overrelaxation as performed by the method of the present invention.

The method of the present invention provides improved stability to growing temperature perturbations compared to the lattice Boltzmann algorithm. The damping rates of long wavelength waves, which determine stability, are derived using a collisional equilibrium distribution function which has the property that the Euler equations are obtained exactly in the limit of zero time step. The method of the present invention has inherent positive hyperviscosity and hyperdiffusivity for very small values of viscosity and thermal diffusivity, which is lacking in the lattice Boltzmann algorithm. Short wavelength modes are shown to be stable for temperatures greater than a lower limit. Results from a computer simulation comparing the method of the present invention with the lattice Boltzmann algorithm confirm damping rate predictions derived analytically. Finite amplitude sound waves in the simulated fluid steepen as expected from gas dynamic theory.

In one embodiment of the present invention, the numerical stability of the lattice Boltzmann method is improved by employing overrelaxation in the advection step. In the example illustrated below, a method of the present invention is implemented by two-time advection, in which the relative weights of the two times are determined by an overrelaxation parameter. With an appropriate choice of the overrelaxation parameter, the second-order dissipation coefficients, i.e., viscosity and thermal diffusivity, respectively, may be made arbitrarily small, while maintaining positive, non-zero fourth-order dissipation coefficients, i.e., hyperviscosity and hyperdiffusivity, respectively. In contrast to the method of the present invention, the fourth-order dissipation coefficients in the lattice Boltzmann method go to zero when the second-order dissipation coefficients go to zero. The improvement in numerical stability realized by the method of the present invention is made apparent when the temperature is allowed to vary, because although the thermal mode tends to be less stable than shear modes, it is stabilized by hyperdiffusivity. The thermal mode is discussed herein under the title "Thermal Diffusivity and Hyperdiffusivity". Short wavelength modes are therefore effectively suppressed by the method of the present invention. Improved stability may be attributed to the fact that in the method of the present invention, hyperviscosity remains positive as viscosity approaches zero.

In lattice-based fluid simulations using the lattice Boltzmann algorithm, fluid variables are time-advanced in a model of molecules that move between points in a spatial grid and collide with one another at velocities that constitute points of a velocity lattice in velocity space. The fluid variables are appropriately weighted sums of the population of these densities over the velocity lattice points. The molecular model is based on the premise that the complexity of hydrodynamics may be accurately described by a simplified version of molecular dynamics.

A distribution function f is defined such that $f(\vec{x}, \vec{c}, t)d^3x$ represents a number of molecules in a spatial volume $d^3x$ at a position $\vec{x}$ with a velocity $\vec{c}$ at a time t. The velocity $\vec{c}$ is one of the velocity lattice points in velocity space. Because of its symmetry properties, the velocity lattice may be described as a four-dimensional face-centered hypercube (FCHC) lattice.

After a time interval or time step $\Delta t$, a molecule at position $\vec{x}$ will move to $\vec{x} + \vec{c}\Delta t$. The positions of the molecules in the spatial volume $d^3x$ define a spatial lattice. The fluid variables, i.e., the density $\rho$, the flow velocity $\vec{u}$, and the average energy per particle $\epsilon$, are defined as moments of the distribution function. The moments are sums over the points of the velocity lattice, which may be expressed by equation (1), $$\rho = \sum_{\vec{c}} f, \quad \rho\vec{u} = \sum_{\vec{c}} \vec{c}f, \quad \rho\varepsilon = \sum_{\vec{c}} e(\vec{c})f, \qquad (1)$$

where $e(\vec{c}) = c^2/2$ is the energy of a molecule with velocity $\vec{c}$ and unity mass.

The simulation method of the present invention follows the fluid variables in time, for given initial and boundary conditions, by time-advancing the distribution function f and evaluating the distribution function f at each time step. Advancing the distribution function f consists basically of particle advection and collisional equilibration. A distinguishing feature of the present invention is the use of overrelaxation in the advection step to provide numerical stability.

Given the values of the fluid variables (density, flow velocity and energy density) at two previous times, and assuming that the distribution function at the two previous times has been set equal to the equilibrium distribution function determined by the fluid variables at those times, the current values of the fluid variables may be determined for the present time by using the following steps:

(1) advecting the distribution function of the previous two times consistent with advection of molecules from other spatial positions as a function of an overrelaxation parameter to obtain an advected distribution function;

(2) calculating values of the fluid variables from the advected distribution function; and (3) setting the distribution function equal to the equilibrium distribution function.

Steps (1)–(3) may be iterated over a desired number of time steps, for example, to simulate the motions of molecules in a compressible fluid.

The advected distribution function is given by equation (2), $$f_*(\vec{x},\vec{c},t) = \alpha f(\vec{x}-\vec{c}\Delta t,\vec{c},t-\Delta t) + (1-\alpha)f(\vec{x}-2\vec{c}\Delta t,\vec{c},t-2\Delta t) \quad (2)$$

where $\alpha$ is the overrelaxation parameter. The distribution function at some time t after many collisions among molecules is assumed to be equal to the equilibrium distribution function given by equation (3), $$f(\vec{x},\vec{c},t) = f^{eq}(\vec{x},\vec{c},t) \quad (3)$$

where $f^{eq}(\vec{x},\vec{c},t)$ is given by an assumed function of $\vec{c}$ chosen such that the particle density, momentum density, and energy density are the same as the advected distribution function given by equation (4):

$$\sum_{\vec{c}} \{1,\vec{c},e(\vec{c})\} f^{eq} = \sum_{\vec{c}} \{1,\vec{c},e(\vec{c})\} f. \quad (4)$$

The Fluid Limit

As with a real gas, fluid behavior is expected in the limit of small time intervals between collisions. The velocities $\vec{c}$ are assumed to be normalized so that the smallest nonzero component along any coordinate axis is unity. The spatial grid separation is then $\Delta x = \Delta t$. The time t is normalized to the duration of the simulation. The time step $\Delta t$ is chosen to be small enough for good resolution of the flows of interest. The advected distribution function may be expanded in a Taylor series from equation (2) to obtain equation (5), $$f_* \simeq f - (2-\alpha)\Delta t \left(\frac{\partial}{\partial t} + \vec{c}\cdot\nabla\right) f + \frac{1}{2}(4-3\alpha)\Delta t^2 \left(\frac{\partial}{\partial t} + \vec{c}\cdot\nabla\right)^2 f \quad (5)$$

where $f = f^{eq}$ is the collisional equilibrium distribution function.

Multiplying equation (5) by $\psi$, where $\psi$ denotes one of the quantities $\{1,\vec{c},e(\vec{c})\}$, and using equations (3) and (4) to sum over the lattice velocities $\vec{c}$ yields equation (8):

$$(2-\alpha)\Delta t \sum_{\vec{c}} \psi\left(\frac{\partial}{\partial t}+\vec{c}\cdot\nabla\right)f + \frac{1}{2}(4-3\alpha)\Delta t^2 \sum_{\vec{c}} \psi\left(\frac{\partial}{\partial t}+\vec{c}\cdot\nabla\right)^2 f = \quad (6)$$

$$\sum_{\vec{c}} \psi(f - f_*) = 0$$

The fluid equations may be obtained from equation (6) with discretization errors of order $\Delta t$ from equation (7):

$$\frac{\partial}{\partial t}\left(\sum_{\vec{c}}\psi f\right) + \nabla\cdot\left(\sum_{\vec{c}}\vec{c}\psi f\right) = \frac{(2-3\alpha/2)}{(2-\alpha)}\Delta t \sum_{\vec{c}} \psi\left(\frac{\partial}{\partial t}+\vec{c}\cdot\nabla\right)^2 f \quad (7)$$

The first set of sums on the left hand side of equation (7) consists of the lowest moments of the equilibrium distribution function, the density, the flow velocity and the energy density as defined by equation (1). The second set of sums on the left hand side of equation (7) includes the momentum flux tensor, defined by equation (8)

$$P_{ij} = \sum_{\vec{c}} c_i c_j f \quad (8)$$

and the energy flux vector, defined by equation (9):

$$\rho\zeta_i = \sum_{\vec{c}} c_i e(\vec{c}) f \quad (9)$$

The traceless momentum flux may be defined by equation (10), $$\rho\pi_{ij} = \sum_{\vec{c}} \left(c_i c_j - \frac{c^2}{4}\delta_{ij}\right) f \quad (10)$$

where the trace of $\delta_{ij}$ is 4 in the 4-dimensional velocity space.

In the limit $\Delta t \to 0$, the fluid equations obtained above may be express ed by equations (11)–(13), $$\frac{\partial\rho}{\partial t} + \frac{\partial}{\partial x_\mu}(\rho u_\mu) = 0 \quad (11)$$

$$\frac{\partial(\rho u_i)}{\partial t} + \frac{\partial}{\partial x_i}(\rho\varepsilon/2) + \frac{\partial}{\partial x_\mu}(\rho\pi_{i\mu}) = 0 \quad (12)$$

$$\frac{\partial(\rho\varepsilon)}{\partial t} + \frac{\partial}{\partial x_\mu}(\rho\zeta_\mu) = 0 \quad (13)$$

where the trace of the momentum flux $P_{\mu\mu}$ is $2\rho\varepsilon$.

The fluid equations may be expanded in $\Delta t$ to higher order for later use as given by equation (14), $$\frac{\partial}{\partial t}\left(\sum_{\vec{c}}\psi f\right) + \nabla\cdot\left(\sum_{\vec{c}}\vec{c}\psi f\right) \simeq \sum_{p=2}^{4}\beta_p \sum_{\vec{c}} \psi\left(\frac{\partial}{\partial t}+\vec{c}\cdot\nabla\right)^p f \quad (14)$$

in which terms of order $\Delta t^4$ are neglected, and in which the values of $\beta$ are given by the equations (15):

$$\beta_2 = \frac{(2-3\alpha/2)}{(2-\alpha)}\Delta t \quad (15)$$

$$\beta_3 = -\frac{(4/3-7\alpha/6)}{(2-\alpha)}\Delta t^2$$

$$\beta_4 = \frac{(2/3-5\alpha/8)}{(2-\alpha)}\Delta t^3$$

The discretization error $o(\Delta t)$ is zero if the overrelaxation parameter $\alpha = 4/3$, giving a first-order approximation that is accurate for the ideal fluid equations. Alternatively, choosing $\alpha < 4/3$, the term proportional to $\beta_2$ may be identified with viscous stress, giving a first-order approximation that is accurate for the viscous fluid equations. In either case, it may be shown that the error in the mass conservation equation is of order $\Delta t^2$.

Recalling that $f=f^{eq}$, it is apparent that the above fluid equations will be identical to the ideal fluid equations in the limit $\Delta t \to 0$, provided that the equilibrium distribution function is chosen to have the correct momentum flux and energy flux moments. The temperature T in terms of the average particle energy may be defined by equation (16), $$\varepsilon = \frac{u^2}{2} + c_v T \tag{16}$$

where $c_v$ is the specific heat at constant volume. Since the velocity space is four dimensional, there are four degrees of freedom. Using units so that the gas constant equals unity, $c_v=2$. A similar equilibrium distribution function may be used to derive the correct specific heat for a diatomic gas ($c_v=5/2$).

To be consistent with the ideal fluid equations, the traceless momentum flux and energy flux preferably has the form given by equations (17) and (18):

$$\pi_{ij} = u_i u_j - \frac{u^2}{4} \delta_{ij} \tag{17}$$

$$\zeta_i = (\varepsilon + T) u_i \tag{18}$$

By substituting equations (17) and (18) into equations (12) and (13), the ideal fluid (Euler) equations may be obtained.

The Equilibrium Distribution Function

There are many possible choices for the equilibrium distribution function that satisfy the requirements of equations (16), (17) and (18). In this example, the stability properties of the method of the present invention are illustrated and compared with the lattice Boltzmann algorithm. An analytical form of the equilibrium distribution function is selected to derive stability properties explicitly by analytical means.

The equilibrium distribution function may be expressed by equation (19), $$f^{eq}(\vec{c}) = \rho F(c^2/2)[1 + g(\vec{c})] \tag{19}$$

where F is determined by minimizing the sum over lattice velocities $\Sigma(F \ln F)$ subject to the constraints given by equations (20), $$\sum_{\vec{c}} F = 1, \quad \sum_{\vec{c}} e(\vec{c}) F = \varepsilon \tag{20}$$

and where g is determined by minimizing $\Sigma(F g^2)$ subject to the constraints given by equations (20) and (20-a), $$\sum_{\vec{c}} Fg = 0, \quad \sum_{\vec{c}} e(\vec{c}) Fg = 0$$

$$\sum_{\vec{c}} F g c_i = u_i, \quad \sum_{\vec{c}} e(\vec{c}) F g c_i = \zeta_i \sum_{\vec{c}} F g \left( c_i c_j - \frac{c^2}{4} \delta_{ij} \right) = \pi_{ij} \tag{20-1}$$

where $\zeta_i$ and $\pi_{ij}$ are assumed given and are related to $\vec{u}$ and $\varepsilon$ by equations (18) and (17).

The choice of the four-dimensional face-centered hypercube (FCHC) lattice simplifies the solution of the above equations because of its symmetry properties. In this example, the smallest number of energy states for which a solution exists is used, i.e., the three energies $n=c^2/2=0,1,2$. Denoting by $d_n$ the number of velocities for energy n, $d_1=d_2=24$ for the FCHC lattice. The velocities for the energy n=1 are the permutations of ($\pm 1, \pm 1, 0, 0$). The velocities for the energy n=2 are the permutations of ($\pm 1, \pm 1, \pm 1, \pm 1$) and the permutations of ($\pm 2, 0, 0, 0$). The number of n=0 states may be arbitrarily assigned. In this example, $d_0=6$, which also simplifies the solution. Equations (21) and (22) may then be derived from equations (21) and (22)

$$F(0) = \frac{1}{4d_0}(2-\varepsilon)^2, \; F(1) = \frac{1}{2d_1}\varepsilon(2-\varepsilon), \; F(2) = \frac{1}{4d_2}\varepsilon^2 \tag{21}$$

$$g(\vec{c}) = B(n) c_\mu u_\mu + D(n) c_\mu \zeta_\mu + A c_\mu c_\nu \pi_{\mu\nu} \tag{22}$$

using the summation convention on repeated indices and equations (23)-(25):

$$B(n) = \frac{8\left[\left(1+\frac{3}{2}\varepsilon\right) - n\left(1+\frac{1}{2}\varepsilon\right)\right]}{\varepsilon^2(2-\varepsilon)} \tag{23}$$

$$D(n) = \frac{8\left[n - \left(1+\frac{1}{2}\varepsilon\right)\right]}{\varepsilon^2(2-\varepsilon)} \tag{24}$$

$$A = \frac{3}{\varepsilon\left(1+\frac{1}{2}\varepsilon\right)} \tag{25}$$

Equilibrium exists for $0<\varepsilon<2$, that is, $0<T<1$ and $u^2<4(1-T)$.

Long Wavelength Stability

Wave damping of long wavelength, small amplitude plane waves in a uniform gas may be used to identify the viscosity, hyperviscosity, thermal diffusivity and hyperdiffusivity. The conditions of positive, non-zero wave damping required for numerical stability with long wavelength perturbations may then be obtained.

The dissipative fluid equations expressed by equation (14) may be used, i.e., $f=f_0+f_1$, where $f_0=\rho_0 F_0(1+g_0)$ corresponds to a time independent uniform state in which $\rho=\rho_0$, $\vec{u}=\vec{u}_0$, and $\varepsilon=\varepsilon_0$ are all constants, and where $f_1$ is defined by equation (26), $$f_1 = (\rho_0 F_1 + \rho_1 F_0)(1+g_0) + \rho_0 F_0 g_1 \tag{26}$$

which contains the perturbed fluid variables $\rho_1$, $\vec{u}_1$, and $\varepsilon_1$. The fluid perturbations are assumed to have the form of plane waves, $\propto \exp(i \vec{k} \cdot \vec{x} - i\omega t)$, so that the perturbed fluid equations may be expressed by the equation (27), $$\sum_{\vec{c}} \psi(\omega - \vec{k}\cdot\vec{c})f_1 = \sum_{p=2}^{4} (-i)^{p-1}\beta_p \sum_{\vec{c}} \psi(\omega - \vec{k}\cdot\vec{c})^p f_1 \qquad (27)$$

where the $\beta_p$s are given by equation (15). $\psi$ is chosen to denote one of the quantities $\{1, \vec{c}, c^2/2 - \epsilon_0\}$. The wave frequencies may be determined in the form $\omega = \omega_1 + \omega_2 + \omega_3 + \omega_4$, where $\omega_1 \propto k$, $\omega_2 \propto \beta_2 k^2$, and $\omega_3 \propto \beta_3 k^3$. The wave number $k = 2n/\lambda$ is assumed to be small, i.e., the wavelength $\lambda$ is assumed to be at least ten times greater than the spacing between particles in the spatial grid.

The discretization error terms on the right hand side of equation (27) proportional to $\beta_2$ represent viscosity and heat conduction. The overrelaxation parameter $\alpha$ may be chosen so that $\beta_2$ is small, which will result in a correspondingly small viscosity. For example, if $\alpha$ is given by equation (28), $$\alpha = \frac{4}{3} - \varepsilon \qquad (28)$$

and $\epsilon \ll 1$, for example, $\epsilon < 0.01$, then the $\beta_s$ may be expressed by equations (29):

$$\beta_2 \simeq \frac{9}{4}\varepsilon\Delta t, \; \beta_3 \simeq \frac{1}{3}\Delta t^2, \; \beta_4 \simeq -\frac{1}{4}\Delta t^3 \qquad (29)$$

The hyperviscosity, as defined in the following section titled "Viscosity and Hyperviscosity", is proportional to $-\beta_4$, which remains positive as $\epsilon$ and the viscosity approach zero. In equations (28) and (29), $\epsilon$ is assumed to be of order $\Delta t$, so that $\beta_2 \sim \beta_3 \sim \Delta t^2$. Corrections to the frequency $\alpha$ proportional to $\beta_2$, $\beta_3$ and $\beta_4$ may then be neglected on the right hand side of equation (27).

The solutions of equation (27) correspond to two transverse modes, or shear modes, and three longitudinal modes. Of the three longitudinal modes, two are sound waves and one is the thermal mode. The shear mode damping determines the shear viscosity and hyperviscosity, and the thermal mode damping determines the thermal diffusivity and hyperdiffusivity. The sound wave dispersion relation determines the anomalous dispersion, which is proportional to $\beta_3$.

Viscosity and Hyperviscosity

The damping of a shear mode may be determined as follows, including terms of order $\beta_2 k^2$ (viscosity) and terms of order $\beta_4 k^4$ (hyperviscosity). Assuming $u_0 = 0$, $\rho_1 = 0$, $\vec{k} \cdot \vec{u}_1 = 0$, and $\epsilon_1 = 0$, using $\psi = \vec{c} \cdot \vec{u}_1$ in equation (27), the frequency is given by $\omega = -i v_2 k^2$, where $v_2$ is defined by equation (30):

$$v_2 = \beta_2 T_0 \qquad (30)$$

By comparing equation (30) with the damping rate obtained from the Navier-Stokes equations, $v_2$ is identified with the kinematic viscosity. Lattice symmetry ensures isotropy for this result, i.e., the damping rate is independent of the direction of wave propagation. $v_2$ is positive and non-zero for $\alpha < 4/3$, and the frequency correction proportional to $\beta_3$ is zero.

For a wave propagation direction along the x axis, the frequency correction proportional to $\beta_4$ is $\omega_4 = -i v_4 k^4$, where $v_4$ is given by equation (31):

$$v_4 = -\beta_4 T_0 \qquad (31)$$

$v_4$ is defined as the hyperviscosity, for which there is no corresponding term in the Navier-Stokes equations. Lattice symmetry does not ensure isotropy for this result, therefore the hyperviscosity may depend to some degree on the direction of wave propagation. $v_4$ is positive and non-zero for $16/15 < \alpha < 4/3$.

When a shear mode is superimposed on a nonzero background flow with velocity $u_0$, and the direction of wave propagation is the same as that of the flow, a modification of the viscosity that is dependent on the flow velocity is given by equation (32):

$$\omega = -i v_2 k^2 \left[ 1 - \frac{5}{6}\frac{u_0^2}{T_0} \right] \qquad (32)$$

Stability therefore requires the following constraint given by equation (33):

$$u_0^2/T_0 < 6/5 \qquad (33)$$

The flow velocity dependence occurs because of the velocity lattice and the specific equilibrium distribution function used and restricts the Mach number to be less than about 0.9 for numerical stability.

Longitudinal Waves

For $\vec{u}_0$, $\vec{k}$ and $\vec{u}_1$ in the x-direction, equation (27) becomes three equations for the perturbed fluid variables $U = (\rho_1/\rho_0, u_1, \epsilon_1)$ and having the form expressed by equation (34), $$MU = NU \qquad (34)$$

where MU contains the nondissipative terms in the perturbed fluid equations, and NU contains the dissipative terms found on the right hand side of equation (27). The lowest order frequencies, keeping only terms of order k, are the roots of det M=0 as expressed by equation (35) or (36), $$\omega_1 = k u_0 \text{ (for thermal modes)} \qquad (35)$$

$$\omega_1 = k u_0 \pm k c_s \text{ (for sound waves)} \qquad (36)$$

where $c_s = (\gamma T_0)^{1/2}$ is the sound speed, and the specific heat ratio is $\gamma = (c_v + 1)/c_v = 3/2$. These results are independent of the direction of wave propagation, and do not depend on the choice of the equilibrium distribution function.

The right hand side of equation (34) may be included using standard matrix perturbation theory to obtain the frequency corrections proportional to $\beta_2$, $\beta_3$, and $\beta_4$.

Thermal Diffusivity and Hyperdiffusivity

Thermal modes have temperature and density perturbations which are such that the pressure perturbation is zero. For damping of thermal modes with zero background flow, $\omega = -i\chi_2 k^2$, where $\chi_2$ is given by equation (37):

$$\chi_2 = \frac{1}{3}\beta_2 T_0. \qquad (37)$$

By comparing equation (37) with solutions of the Navier-Stokes equations, $\chi_2$ may be identified as the thermal diffusivity. Because $v_2/\chi_2 = 3$, the thermal diffusivity is positive whenever the viscosity is positive. This ratio, also known as the Prandtl number, may better approximate actual values for diatomic gases in a more complex equilibrium distribution function.

A perturbation calculation including the $\beta_3$ and $\beta_4$ terms in equation (34) may be performed in a manner similar to the calculation for the shear mode. The frequency correction proportional to $\beta_3$ is zero. The next frequency correction is $\omega_4=1-i\chi_4 k^4$, where $\chi_4$ is defined as the hyperdiffusivity and is given by equation (38), $$\chi_4 = -\frac{5}{3}\beta_4 T_0(1-T_0) \tag{38}$$

which is positive for $0<T_0<1$.

Comparison with the Lattice Boltzmann Method

The lattice Boltzmann algorithm may be described as follows. Given $f(\vec{x},\vec{c},t,-\Delta t)$, the advected distribution function may be expressed by equation (39), $$f_*(\vec{x},\vec{c})=f(\vec{x}-\vec{c}\Delta t,c,t-\Delta t) \tag{39}$$

and the collision step may be expressed by equation (40), $$f(\vec{x},\vec{c},t)=\omega f^{eq}+(1-\omega)f_*(\vec{x},\vec{c}) \tag{40}$$

where $\omega$ is the collisional overrelaxation parameter, and $f^{eq}$ is the equilibrium distribution function.

In the lattice Boltzmann algorithm, the fluid equations are obtained and the parameters $\beta_2$, $\beta_3$, and $\beta_4$ are derived which determine the long wavelength damping and stability as follows. A Taylor expansion of $f_*$ in equation (40) yields equation (41), $$f \simeq f^{eq} + \frac{(1-\omega)}{\omega}\sum_{p=1}^{3}\frac{(-\Delta t)^p}{p!}d^p f \tag{41}$$

where $d=\partial/\partial t+\vec{c}\cdot\nabla$. $f$ may be expanded consistently in powers of $\Delta t$ to obtain equation (42), $$f = f^{eq} - \frac{(1-\omega)}{\omega}\Delta t\, df^{eq} + \left[\frac{(1-\omega)}{2\omega}+\frac{(1-\omega)^2}{\omega^2}\right]\Delta t^2 d^2 f^{eq} - \left[\frac{(1-\omega)}{6\omega}+\frac{(1-\omega)^2}{\omega^2}+\frac{(1-\omega)^3}{\omega^3}\right]\Delta t^3 d^3 f^{eq} \tag{42}$$

in which terms of order $\Delta t^4$ are neglected.

The fluid equations in the form given by equation (14) are then obtained using the definitions given by equations (43)–(45):

$$\beta_2 = \left(\frac{1}{\omega}-\frac{1}{2}\right)\Delta t \tag{43}$$

$$\beta_3 = -\left[\left(\frac{1}{\omega}-1\right)^2+\frac{1}{\omega}-\frac{5}{6}\right]\Delta t^2 \tag{44}$$

$$\beta_4 = \left[\left(\frac{1}{\omega}-1\right)^3+\frac{3}{2}\left(\frac{1}{\omega}-1\right)^2+\frac{7}{12}\left(\frac{1}{\omega}-1\right)+\frac{1}{24}\right]\Delta t^3 \tag{45}$$

Definitions (43)–(45) may be compared with equation (15) to illustrate the advantage of stability gained in the method of the present invention. From this point on, the long wavelength analysis is the same as described for the method of the present invention. The viscosity is proportional to $\beta_2$ and the hyperviscosity is proportional to $-\beta_4$. The viscosity is positive when $\omega<2$. $\omega$ may be chosen as follows so that $\beta_2$ and the viscosity are small. For example, if $\omega$ is given by equation (46), $$\omega=2-\epsilon \tag{46}$$

and if $\epsilon<<1$, for example, $\epsilon<0.01$, then the $\beta_s$ are given by equations (47):

$$\beta_2\approx\epsilon\Delta t/4,\; \beta_3\approx\Delta t^2/6,\; \beta_4\approx-\epsilon\Delta t^3/24 \tag{47}$$

Note that $-\beta_4$, which is proportional to the hyperviscosity, is also small when the viscosity is small, which suggests that short waves generated by nonlinearity are unstable using the lattice Boltzmann algorithm.

The fact that $\beta_4$ does not go to zero when $\beta_2$ goes to zero as shown in equation (29) is an important feature of the present invention. When the viscosity and thermal diffusivity are very small, short wavelength numerical instabilities will be effectively damped in the advection with overrelaxation method of the present invention, but not in the lattice Boltzmann algorithm. The method of the present invention is therefore numerically more stable than the lattice Boltzmann algorithm, as shown in the simulation results described in the section titled "Simulation Results".

Short Wavelength Stability

For perturbations with short wavelengths, assuming zero unperturbed flow ($u_0=0$) and propagation in the x-direction, the stability of the method of the present invention illustrated in equations (2)–(4) may be demonstrated as follows. Let $f=f_0+f_1$, where $f_0$ is the equilibrium distribution function for uniform density and temperature, and $f_1(x,\vec{c},t_n)\propto\lambda^n\exp(ikx)$. Stability requires the constraint given by equations (48) and (49), $$|\lambda|\leq 1 \tag{48}$$

$$\sum_{\vec{c}}\psi(f_1-f_{1*})=0 \tag{49}$$

where the perturbed equilibrium distribution function $f_1$ is given by equation (26) and the perturbed advected distribution function is given by equation (50), $$f_{1*} = f_1\left[\frac{\alpha}{\lambda}\exp(-i\Theta c_x)+\frac{(1-\alpha)}{\lambda^2}\exp(-2i\Theta c_x)\right] \tag{50}$$

where $\Theta=k\Delta x$, $\Delta x$ is the grid spacing, $c_x$ is normalized to $\Delta x/\Delta t$, and $\Delta t=t_{n+1}-_n$ is the time step. In this example, only the shortest possible wavelength ($k\Delta x=\pi$) is considered.

For shear modes, $\psi=c_y$, and the dispersion relation is given by equation (51), $$\lambda^2\alpha\mu\lambda+\alpha-1=0 \tag{51}$$

where $\mu$ is given by equation (52), $$\mu = \sum_{\vec{c}}c_y^2 F_0[B_0+3T_0 D_0](-1)^\alpha = 1-T_0 \tag{52}$$

and $B_0$ and $D_0$ are given by equations (23) and (24) with $\epsilon=\epsilon_0$. These modes are stable for $0\leq T_0\leq 1$.

For longitudinal modes such as sound waves and the thermal mode, $\lambda$ is again determined by equation (51), where $\mu$ is an eigenvalue of the matrix h defined by equation (53), $$h_{ij} = \sum_{\vec{c}} \psi_i g_j F_0 (-1)^\alpha \quad (53)$$

and where $g_1=1$, $g_2=[B_0+3T_0D_0]c_x$, and $g_3=(\partial F_0/\partial \epsilon_0)/F_0$.

The matrix h has a simple block structure, and the eigenvalues which correspond to nonzero $\rho_1$ and $\epsilon_1$ are stable for $0 \leq T_0 \leq 1$. The eigenvalue which corresponds to nonzero $u_1$ is stable if $T_0 \leq \frac{1}{3}$. The temperature range for stability is therefore given by equation (54):

$$\tfrac{1}{3} \leq T_0 \leq 1 \quad (54)$$

Simulation Results

Figure 1:
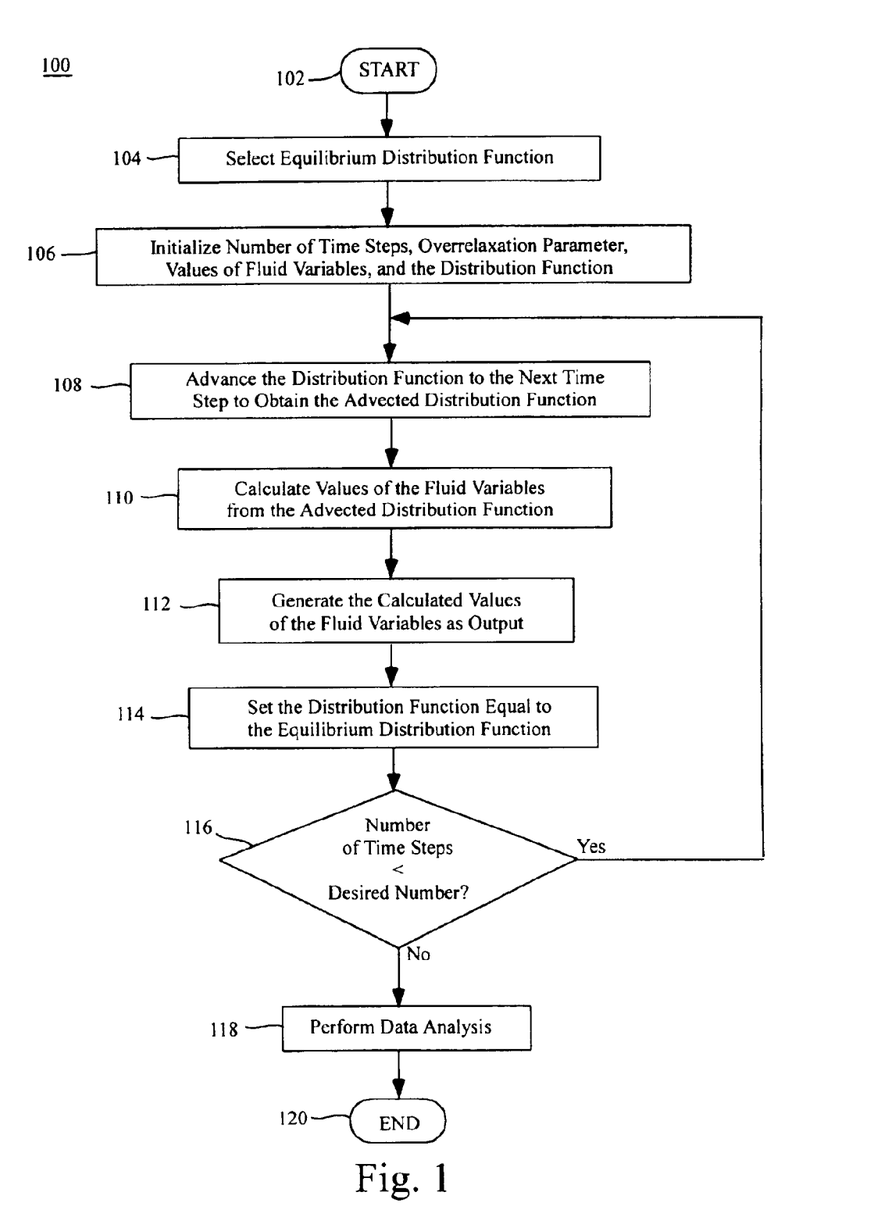
FIG. 1 illustrates a flowchart of a method of simulating a compressible fluid in accordance with the present invention.

FIG. 1 illustrates a flowchart 100 of a method of simulating a compressible fluid in accordance with a method of the present invention.

Step 102 is the entry point of the flow chart 100.

In step 104, an equilibrium distribution function is selected to simulate a compressible fluid. In addition to the constraints that the density, flow velocity, and energy density moments must be the same as those obtained from the advected distribution function, the equilibrium distribution function is selected so that the momentum flux and energy flux are related to the other moments in a way which is consistent with the ideal fluid (Euler) equations. The additional constraints ensure that the ideal fluid equations are recovered exactly in the limit of zero time step, eliminating certain types of calculation errors that can obscure the results.

In step 106, an initialization is performed to establish values for the number of desired time steps, the desired value for the overrelaxation parameter, and appropriate initial conditions including values of the fluid variables for the first time step $t_0$. For example, density $\rho=\rho_0$, velocity $u_x=u_0$, $u_y=u_{y1}\cos(kx)$, $u_z=0$, and temperature $T=T_0$. The initial values may be received as input from an input file. The distribution function is set equal to the equilibrium distribution function.

In step 108, the distribution function is advanced to the next time step to obtain an advected distribution function as a function of the overrelaxation parameter and spatial positions of particles of the compressible fluid at the two previous time steps from the equation:

$$f_*(\vec{x},\vec{c},t) = \alpha f(\vec{x}-\vec{c}\Delta t, \vec{c}, t-\Delta t) + (1-\alpha)f(\vec{x}-2\vec{c}\Delta t, \vec{c}, t-2\Delta t)$$

In step 110, values of the fluid variables for density, flow velocity, and energy are calculated respectively as moments of the advected distribution function over microscopic states $\vec{c}$ from the equations $$\rho(\vec{x},t) = \sum_{\vec{c}} f_*(\vec{x},\vec{c},t)$$

$$\vec{u}(\vec{x},t) = \sum_{\vec{c}} \vec{c} f_*(\vec{x},\vec{c},t)/\rho(\vec{x},t)$$

$$\varepsilon(\vec{x},t) = \sum_{\vec{c}} e(\vec{c}) f_*(\vec{x},\vec{c},t)$$

where $e(\vec{c})$ equals the particle energy for state $\vec{c}$.

In step 112, values of the fluid variables are generated as output for the current time step from the advected distribution function.

In step 114, the distribution function is set equal to the equilibrium distribution function given by the equation $$f(\vec{x},\vec{c},t) = F^{eq}[f_*(\vec{x},\vec{c},t)]$$

where $F^{eq}$ is an assumed function of state $\vec{c}$ and depends on $\rho$, $\vec{u}$, and $\epsilon$.

In step 116, if the current time step is less than the desired number of time steps, control transfers to step 108. Otherwise, control transfers to step 118.

In step 118, a data analysis is performed on the values of the fluid variables generated in step 112. For example, the data for the velocity, $u_y(x,t)=a(t)\cos(kx-ku_0t)$, where $a(t)=a(0)\exp(-v_2k^2t-v_4k^4t)$. The viscosity is $v_2$ and the hyperviscosity is $v_4$. Plots of the velocity, the time dependence of the amplitude a(t), and the density and the temperature perturbation may be generated as outputs.

Step 120 is the exit point of the flow chart 100.

Although the flowchart example described above has been shown with reference to specific steps performed in a specific order, these steps may be combined, sub-divided, or reordered in other embodiments without departing from the scope of the claims. Unless specifically indicated herein, the order and grouping of steps is not a limitation of the present invention.

In another aspect of the present invention, the method illustrated in the description above may be embodied in a computer program product and implemented by a computer according to well known programming techniques to perform the following functions: receiving as input an initial value of at least one variable of a distribution function having at least two time steps; setting the distribution function equal to the equilibrium distribution function; deriving an advected distribution function from the distribution function evaluated at the at least two time steps; calculating a current value of the at least one variable from the advected distribution function; and generating as output the current value of the at least one variable.

Appendix II is a listing of a computer program embodying the flowchart of FIG. 1 according to an embodiment of the present invention. The initial conditions for the results explained below correspond to the modes explained above. In the example illustrated, periodic boundary conditions are used. The computed fluid moments are analyzed by fitting the periodic boundary conditions to propagating waves to determine the phase velocities and wave damping rates. The Mach number is defined in terms of the unperturbed flow velocity and temperature: $M=u_0/(\gamma T_0)^{1/2}$, where y is the specific heat ratio of the fluid. The overrelaxation parameter $\alpha$ is determined from $\alpha=(\frac{1}{3})(1-\beta_2)/(1-(\frac{2}{3})\beta_2)$ with $\beta_2$ being an input parameter representative of the viscosity.

Figure 2A:
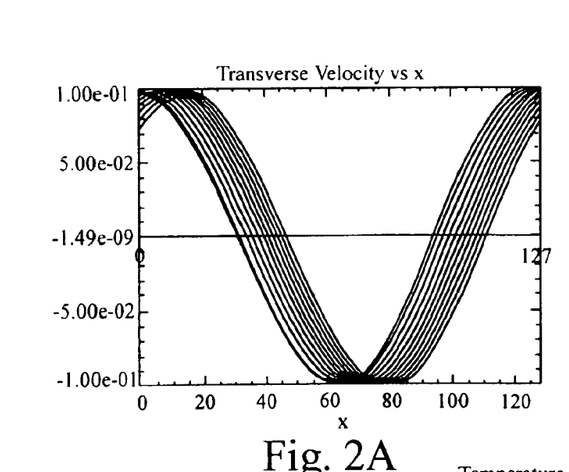
FIGS. 2A, 2B, and 2C illustrate simulation results from a computer program implementing the flowchart of FIG. 1.
Figure 2B:
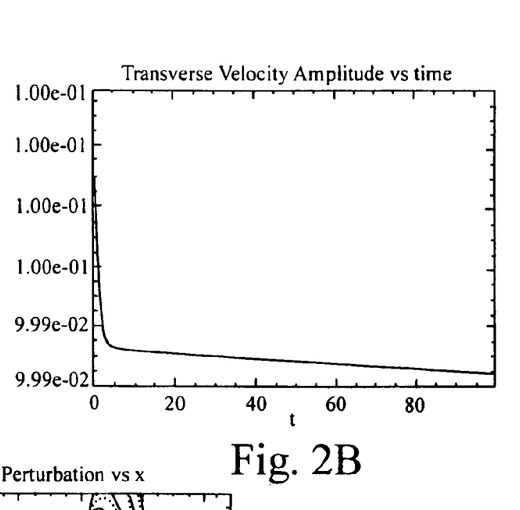
Figure 2C:
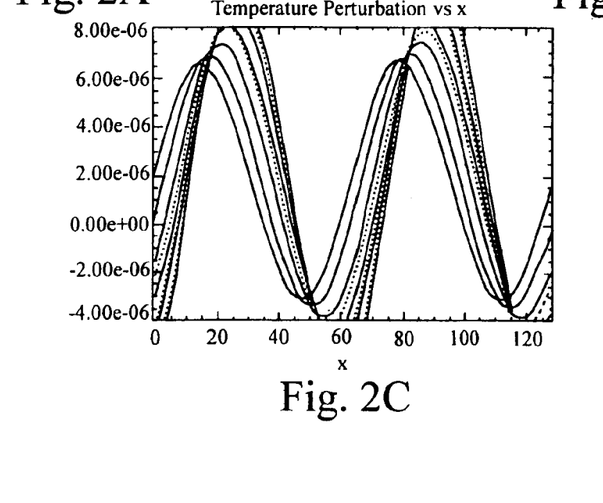

FIGS. 2A, 2B, and 2C illustrate simulation results from a computer program implementing the flowchart of FIG. 1.

FIG. 2A illustrates a plot of the transverse velocity as a function of x for a shear wave generated by the computer program in Appendix II.

FIG. 2B illustrates a plot of the amplitude of the shear wave of FIG. 2A as a function of time. The plot shows that the amplitude decreases with time.

FIG. 2C illustrates a plot of the temperature perturbation versus x for the shear mode of FIG. 2A convected by a uniform fluid flow at Mach 0.2. In this example, $\beta_2=0$, so the viscosity should be zero; the wave is damped very slightly by hyperviscosity. The initial rapid damping is an artifact due to the fact that only one past time is available for the first time step. The parameter a is therefore set equal to unity for the first step, and a few time steps are required before the predicted wave damping rate is achieved. The very small temperature perturbation shown is due to hyperviscous heating. The dotted curves show the fitted sinusoidal waves with twice the wave number, which is consistent with the heating being nonlinear in the velocity derivatives.

Figure 3A:
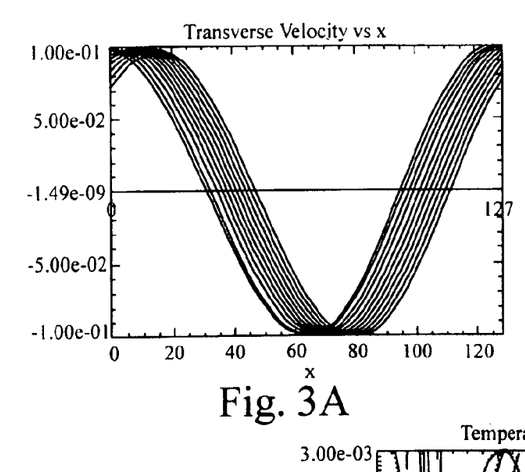
FIGS. 3A, 3B, and 3C illustrate simulation results using the lattice Boltzmann algorithm with the same input parameters as in FIG. 2.
Figure 3B:
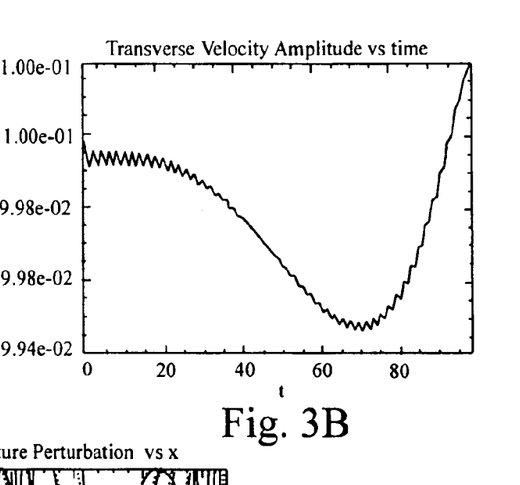
Figure 3C:
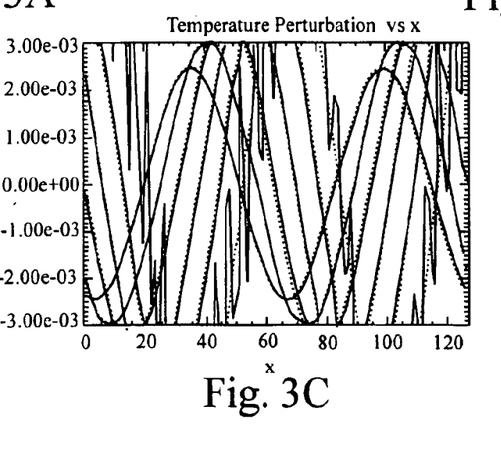

FIGS. 3A, 3B, and 3C illustrate simulation results using the lattice Boltzmann algorithm with the same input parameters as in FIG. 2.

FIG. 3A illustrates a plot of the transverse velocity as a function of x for a shear wave using the lattice Boltzmann algorithm with the same input parameters as in FIG. 2.

FIG. 3B illustrates a plot of the amplitude of the shear wave of FIG. 3A as a function of time. Using the lattice Boltzmann algorithm, the shear wave is unstable for the same parameters used in FIG. 2. The growing short wave temperature perturbations cause the shear wave to break up, starting at around the last time shown.

Shear waves simulated using the advection with overrelaxation method of the present invention with different wave numbers were used to fit the damping rate $\Gamma$ to equation (55)

$$\Gamma(k)=v_2k^2+v_4k^4 \qquad (55)$$

for $T_0=0.4$, $M=0.1$ and two different values of $\beta_2$. The viscosity $v_2$ and hyperviscosity $v_4$ agree reasonably well with the analytical results given by equations (29)–(32). For $\beta_2=0.10$, the simulation results are $v_2=3.96\times10^{-2}$ and $v_4=6.3\times10^{-2}$, which compares favorably with the analytical results $v_2=3.95\times10^{-2}$ and $v_4=7.7\times10^{-2}$. For $\beta_2=0.01$, the simulation results are $v_2=3.98\times10^{-3}$ and $v_4=9.2\times10^{-2}$, which compares favorably with the analytical results $v_2=3.95\times10^{-3}$ and $v_4=9.8\times10^{-2}$.

The viscosity was determined for different Mach numbers, for the same values of $\beta_2$. The Mach number dependence agrees reasonably well with equation (32). For $\beta_2=0.10$, $v_2(M)=0.042(1.0-0.48M^2)$, which compares favorably with the analytical result $v_2(M)\, 0.040(1.0-1.25M^2)$. For $\beta_2=0.01$, $v_2(M)=0.0044(1.0-0.45M^2)$, which compares favorably with the analytical result $v_2(M)=0.004(1.0-1.25M^2)$.

The damping rates for thermal waves convected by a uniform fluid flow at Mach 0.1 for $T_0=0.4$, using the method of the present invention, were calculated for different values of $\beta_2$ and fitted to equation (56):

$$\Gamma(k)=\chi_2 k^2+\chi_4 k^4 \qquad (56)$$

The thermal diffusivity $\chi_2$ and hyperdiffusivity $\chi_4$ agree reasonably well with the analytical results of equations (37) and (38), neglecting finite M corrections. For $\beta_2=0.10$, $\chi_2=1.2\times10^{-2}$ and $\chi_4=5.6\times10^{-2}$, which compares favorably with the analytical results $\chi_2=1.3\times10^{-2}$ and $\chi_4=7.7\times10^{-2}$. For $\beta_2=0.01$, $\chi_2=1.1\times10^{-3}$ and $\chi_4=4.6\times10^{-2}$, which compares favorably with the analytical results $\chi_2=1.3\times10^{-3}$ and $\chi_4=9.8\times10^{-2}$.

FIG. 3C illustrates a plot of temperature perturbation due to heating by the shear wave of FIG. 2. Using the lattice Boltzmann algorithm, thermal modes are found to be generally unstable. The temperature and density perturbations increase with time, that is, the temperature perturbation generated by heating is unstable, especially when the thermal diffusivity is very small and when the wavelengths are short. This may be the cause of the instability in the lattice Boltzmann algorithm which breaks up shear waves as shown in FIG. 3B. Using the lattice Boltzmann algorithm, sound waves are found generally to be unstable for most of the parameters used in these simulations.

The dispersion curves for small amplitude ($\rho_1/\rho_0=0.01$) sound waves were determined for two different temperatures, $T_0=0.35$ and $0.45$, and for flow velocities $u_{0x}=-0.15$, $0.0$, and $0.15$, using the method of the present invention. The wave frequency was fitted to a function of wave number given by equation (57), $$\omega=ku_0+kc_s+\delta_3 k^3 \qquad (57)$$

where $c_s=(\gamma T_0)^{1/2}$ is the sound speed and $\delta_3$ is the anomalous dispersion coefficient. The measured specific heat ratio is in excellent agreement with the theoretical value $\gamma=1.5$, with relative errors less than $1.6\times10^{-4}$. The anomalous dispersion term, proportional to $\delta_3$ gives a very small correction to the phase velocity, of about $3\times10^{-3}$.

Figure 4A:
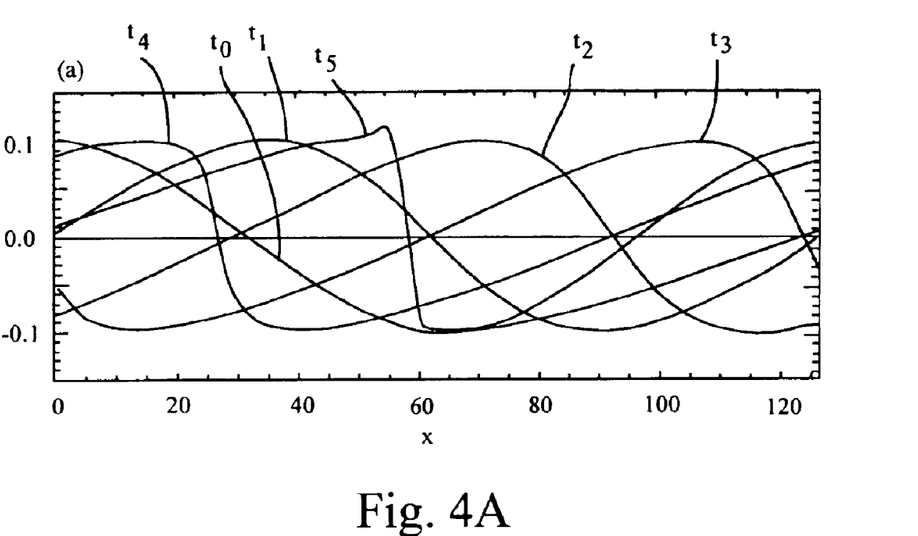
FIGS. 4A and 4B illustrate steepening of a large amplitude sound wave from the simulation results of FIG. 1.
Figure 4B:
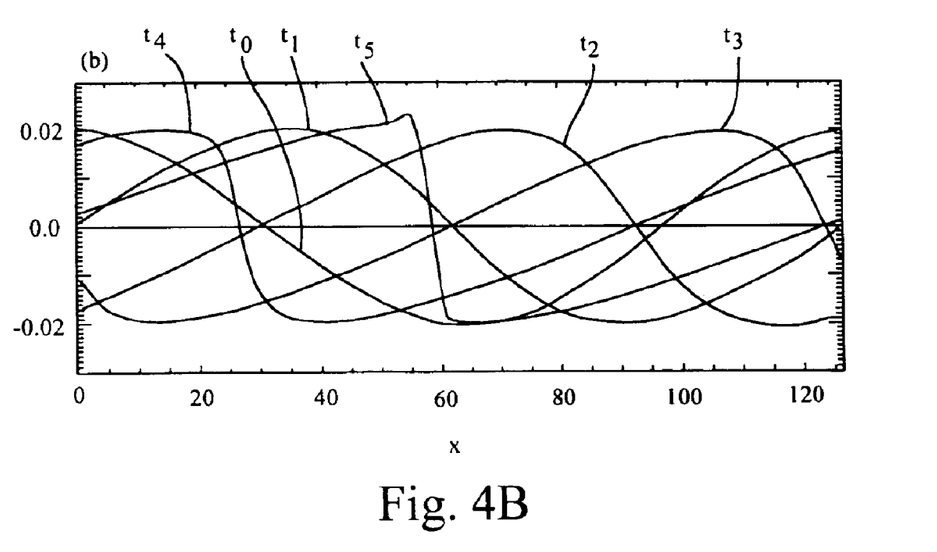

FIGS. 4A and 4B illustrate steepening of a large amplitude sound wave from the simulation results of FIG. 1. The amplitude of the sound wave is plotted every 50 time steps for 250 time steps, which is the total steepening time.

FIG. 4A illustrates the density perturbation as a function of x for each 50 time steps ending with the estimated steepening time of 250 time steps. The estimated steepening time, $t_s\sim1/(ku_1)$, is about 250 time steps. The density and temperature modes are plotted for the time steps $t_0$, $t_1$, $t_2$, $t_3$, $t_4$, and $t_5$.

FIG. 4B illustrates the temperature perturbation as a function of x for a time series ending with the estimated steepening time. A large amplitude ($\rho_1/\rho_0=0.1$) sound wave propagating upstream through a uniform flow in the -x direction at Mach 0.2 was found to steepen as expected from gas dynamic theory. The sound wave becomes very steep during that time, as expected from gas dynamic theory.

The method for simulating a compressible fluid described above demonstrates highly improved numerical stability compared with the lattice Boltzmann algorithm, i.e., the Chapman-Enskog method for deriving fluid equations from the Boltzmann equation. In contrast to other methods, the method of the present invention includes a discretized form of the Boltzmann equation. At each time step, the velocity distribution function is set equal to a collisional equilibrium distribution function to ensure that the fluid variables evolve in a manner similar to solutions of the ideal fluid equations, except for the small effects of nonzero spatial and temporal discreteness. The leading order effects of discreteness appear as viscosity and thermal diffusivity, and are similar to real gas dissipation effects, which are a result of nonzero mean free path. The size of these dissipation effects is controlled by an advection overrelaxation parameter, and may be made arbitrarily small. Higher order effects of discreteness appear as anomalous dispersion, and also as hyperviscosity and hyperdiffusivity, which provide a stabilizing effect in simulations for which the viscosity and thermal diffusivity are very small.

The damping rates of shear waves and thermal waves in the simulated fluid are used to determine viscosity, thermal diffusivity, hyperviscosity and hyperdiffusivity, and these are in favorable agreement with analytical predictions. Also, the anomalous dispersion of sound waves determined from measurements of the phase velocity is shown to be very small, and sound waves are shown to steepen, in agreement with gas dynamic theory.

Lattice methods typically simulate a fluid having unrealistic properties resulting from the use of a lattice, i.e., lattice artifacts. In the method of the present invention, however, a collisional equilibrium distribution function is used that has exactly zero artifacts at the Euler level of description, i.e. the Euler equations are obtained exactly in the limit of zero time step. The collisional equilibrium distribution function has a simple analytical form afforded by the choice of a four-dimensional face-centered hypercube (FCHC) lattice that enables analytical predictions of stability to long wave perturbations.

Lattice methods are generally fast compared with conventional methods used in computational fluid dynamics, because lattice methods involve relatively simple operations. Lattice methods are also highly parallel when implemented using domain decomposition on massively parallel computers, because communication between processors is only required for particle advection near subdomain boundaries. The computer code example in Appendix II uses domain decomposition and Multiple Processor Interface (MPI), a standard method for interprocessor communication. FIGS. 4A and 4B were made using the data calculated on a Linux Beowulf cluster using 16 processors.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

What is claimed is:

1. A method of simulating a compressible fluid comprising:
   selecting an equilibrium distribution function for simulating a fluid;
   receiving as input an initial value of at least one variable of a distribution function having for at least two time steps;
   setting the distribution function equal to the equilibrium distribution function;
   deriving an advected distribution function from the distribution function evaluated at the at least two time steps;
   calculating a current value of the at least one variable from the advected distribution function; and
   generating as output the current value of the at least one variable.

2. The method of claim 1 wherein the equilibrium distribution function includes constraints such that ideal fluid equations are recovered in a limit of zero time step.

3. The method of claim 1 wherein the equilibrium distribution function is given by the equation $f^{eq}(\vec{c})=\rho F(c^2/2)[1+g(\vec{c})]$ wherein F is determined by minimizing a sum over lattice velocities given by the formula $\Sigma(F \ln F)$ subject to the constraints given by the equations $$\sum_{\vec{c}} F = 1 \text{ and } \sum_{\vec{c}} e(\vec{c})F = \varepsilon f$$

and wherein g is determined by minimizing the formula $\Sigma(F g^2)$ subject to the constraints given by the equations $$\sum_{\vec{c}} Fg = 0, \sum_{\vec{c}} e(\vec{c})Fg = 0, \sum_{\vec{c}} Fgc_i = u_i,$$

$$\sum_{\vec{c}} e(\vec{c})Fgc_i = \zeta_i, \text{ and } \sum_{\vec{c}} Fg = \left(c_i c_j - \frac{c^2}{4}\delta_{ij}\right) = \pi_{ij}.$$

4. The method of claim 1 wherein the at least one variable is a moment of the advected distribution function summed over a plurality of lattice velocities.

5. The method of claim 1 wherein the at least one variable is representative of information carried by a plurality of particles constituting a fluid.

6. The method of claim 5 wherein the information includes at least one of particle density, flow velocity, and energy density.

7. The method of claim 6 wherein the particle density, flow velocity, and energy density are defined respectively by $$\rho(\vec{x}, t) = \sum_{\vec{c}} f_*(\vec{x}, \vec{c}, t), \vec{u}(\vec{x}, t) = \sum_{\vec{c}} \vec{c} f_*(\vec{x}, \vec{c}, t)/\rho(\vec{x}, t),$$

and $$\varepsilon(\vec{x}, t) = \sum_{\vec{c}} e(\vec{c})f_*(\vec{x}, \vec{c}, t)$$

where $f$ is defined as the distribution function such that $f(\vec{x},\vec{c},t)d^3x$ represents a number of particles in a spatial volume $d^3x$ at a position $\vec{x}$ with a velocity $\vec{c}$ at a time t, $\vec{c}$ is a point of a velocity lattice in velocity space, $\rho$ is the particle density, $\vec{u}$ is the flow velocity, $\epsilon$ is the energy density, and $e(\vec{c})=c^2/2$ is an energy of a particle with velocity $\vec{c}$ and unity mass.

8. The method of claim 7 wherein the velocity lattice is a four-dimensional face-centered hypercube lattice.

9. The method of claim 8 wherein the advected distribution function is calculated from the formula $f_*(\vec{x},\vec{c},t)=\alpha f(\vec{x}-\vec{c}\Delta t,\vec{c},t-\Delta t)+(1-\alpha)f(\vec{x}-2\vec{c}\Delta t,\vec{c},t-2\Delta t)$ wherein a is an overrelaxation parameter and $\Delta t$ is a time step.

10. The method of claim 9 wherein the particle density, the momentum density, and the energy density of the equilibrium distribution function are substantially equal to the particle density, the momentum density, and the energy density of the advected distribution function according to the equation $$\sum_{\vec{c}} \{1, \vec{c}, e(\vec{c})\}f^{eq} = \sum_{\vec{c}} \{1, \vec{c}, e(\vec{c})\}f_*.$$

11. The method of claim 10 wherein the distribution function is set equal to the equilibrium distribution function according to the equation $f(\vec{x},\vec{c},t)=F^{eq}[ff_*(\vec{x},\vec{c},t)]$ where $F^{eq}$ is an assumed function of state $\vec{c}$ that depends on $\rho$, $\vec{u}$, and $\epsilon$.

12. The method of claim 1 wherein the adverted distribution function has values of hyperviscosity and hyperdiffusivity that are positive and non-zero above a minimum temperature for arbitrarily small values of viscosity and thermal diffusivity.

13. The method of claim 1 further comprising performing a data analysis of the at least one variable.

14. A computer program product comprising:
   a medium for embodying a computer program for input to a computer; and
   a computer program embodied in the medium for causing the computer to perform the following functions;
   selecting an equilibrium distribution function for simulating a fluid;
   receiving as input an initial value of at least one variable of a distribution function having for at least two time steps;
   setting the distribution function equal to the equilibrium distribution function;
   deriving an advected distribution function from the distribution function evaluated at the at least two time steps;

calculating a current value of the at least one variable from the advected distribution function; and generating as output the current value of the at least one variable.

15. The computer product of claim 14 wherein the equilibrium distribution function includes constraints such that ideal fluid equations are recovered in a limit of zero time step.

16. The computer product of claim 14 wherein the equilibrium distribution function is given by the equation $f^{eq}(\vec{c})=\rho F(c^2/2)[1+g(\vec{c})]$ wherein F is determined by minimizing a sum over lattice velocities given by the formula $\Sigma(F \ln F)$ subject to the constraints given by the equations $$\sum_{\vec{c}} F = 1 \text{ and } \sum_{\vec{c}} e(\vec{c})F = \varepsilon$$

and wherein g is determined by minimizing the formula $\Sigma(F g^2)$ subject to the constraints given by the equations $$\sum_{\vec{c}} Fg = 0, \quad \sum_{\vec{c}} e(\vec{c})Fg = 0, \quad \sum_{\vec{c}} Fgc_i = u_i, \quad \sum_{\vec{c}} e(\vec{c})Fgc_i = \zeta_i,$$

and $$\sum_{\vec{c}} Fg\left(c_i c_j - \frac{c^2}{4}\delta_{ij}\right)_l = \pi_{ij}.$$

17. The computer product of claim 14 wherein the at least one variable is a moment of the advected distribution function summed over a plurality of lattice velocities.

18. The computer product of claim 14 wherein the at least one variable is representative of information carried by a plurality of particles constituting a fluid.

19. The computer product of claim 18 wherein the information includes at least one of particle density, flow velocity, and energy density.

20. The computer product of claim 19 wherein the particle density, flow velocity, and energy density are defined respectively by the equations $$\rho(\vec{x}, t) = \sum_{\vec{c}} f_*(\vec{x}, \vec{c}, t), \vec{u}(\vec{x}, t) = \sum_{\vec{c}} \vec{c} f_*(\vec{x}, \vec{c}, t)/\rho(\vec{x}, t),$$

and $$\varepsilon(\vec{x}, t) = \sum_{\vec{c}} e(\vec{c})f_*(\vec{x}, \vec{c}, t)$$

wherein $f$ is defined as the distribution function such that $f(\vec{x},\vec{c},t)d^3x$ represents a number of particles in a spatial volume $d^3x$ at a position $\vec{x}$ with a velocity $\vec{c}$ at a time t and wherein $\vec{c}$ is a point of a velocity lattice in velocity space, $\rho$ is the particle density, $\vec{u}$ is the flow velocity, $\epsilon$ is the energy density, and $e(\vec{c})=c^2/2$ is an energy of a particle with velocity $\vec{c}$ and unity mass.

21. The computer product of claim 20 wherein the velocity lattice is a four-dimensional face-centered hypercube lattice.

22. The computer product of claim 21 wherein the advected distribution function is calculated from the equation $f_*(\vec{x},\vec{c},t)=\alpha f(\vec{x}-\vec{c}\Delta t,\vec{c},t-\Delta t)+(1-\alpha)f(\vec{x}-2\vec{c}\Delta t,\vec{c},t-2\Delta t)$ wherein a is an overrelaxation parameter and $\Delta t$ is a time step.

23. The computer product of claim 22 wherein the particle density, the momentum density, and the energy density of the equilibrium distribution function are substantially equal to the particle density, the momentum density, and the energy density of the advected distribution function as given by the equations $$\sum_{\vec{c}} \{1, \vec{c}, e(\vec{c})\}f^{eq} = \sum_{\vec{c}} \{1, \vec{c}, e(\vec{c})\}f_{*_i}.$$

24. The computer product of claim 14 wherein the distribution function is set equal to the equilibrium distribution function as given by the equation $f(\vec{x},\vec{c},t)=F^{eq}[f_*(\vec{x},\vec{c},t)]$ where $F^{eq}$ is an assumed function of state $\vec{c}$ that depends on $\rho$, $\vec{u}$, and $\epsilon$.

25. The computer product of claim 14 wherein the advected distribution function has values of hype viscosity and hyperdiffusivity that are positive and non-zero above a minimum temperature for arbitrarily small values of viscosity and thermal diffusivity.

26. The computer product of clam 14 further comprising performing a data analysis of the at least one variable.

\* \* \* \* \*

UNITED STATES PATENT AND TRADEMARK OFFICE
CERTIFICATE OF CORRECTION

PATENT NO. : 6,915,245 B1
DATED : July 5, 2005
INVENTOR(S) : Frederick L. Hinton et al.

It is certified that error appears in the above-identified patent and that said Letters Patent is hereby corrected as shown below:

Column 17,
Line 26, after "having" delete "for";
Line 45, change the formula to read:

$$-- \sum_{\vec{c}} Fgc_i = u_i, \quad \sum_{\vec{c}} e(\vec{c}) Fgc_i = \zeta_i, \quad \text{and} \quad \sum_{\vec{c}} Fg\left(c_i c_j - \frac{c^2}{4}\delta_{ij}\right) = \pi_{ij} --.$$

Column 18,
Line 27, change "a" to -- $\alpha$ --;
Line 61, after "having" delete "for";

Column 20,
Line 33, change the formula to read:

$$-- \sum_{\vec{c}} \{1, \vec{c}, e(\vec{c})\} f^{eq} = \sum_{\vec{c}} \{1, \vec{c}, e(\vec{c})\} f. --$$

Line 44, change " hype viscosity" to -- hyperviscosity --;
Line 48, change "clam 14" to -- claim 14 --.

Signed and Sealed this

Twenty-fourth Day of January, 2006

JON W. DUDAS
*Director of the United States Patent and Trademark Office*